United States Patent [19]

Wilson et al.

[11] 3,762,431

[45] Oct. 2, 1973

[54] PRESSURE REGULATOR CONSTRUCTION AND SYSTEM UTILIZING THE SAME

[75] Inventors: Calvin L. Wilson; John H. Fox, Jr., Richmond, Va.

[73] Assignee: Reynolds Metals Company, Richmond, Va.

[22] Filed: Dec. 29, 1971

[21] Appl. No.: 213,701

[52] U.S. Cl......... 137/116.3, 137/263, 137/505.11, 222/397, 222/399
[51] Int. Cl.............................................. F16k 17/06
[58] Field of Search...................... 137/116.3, 116.5, 137/263, 266, 505.11, 505.39; 222/397, 399; 261/DIG: 7

[56] References Cited

UNITED STATES PATENTS

| | | | |
|---|---|---|---|
| 2,189,448 | 2/1940 | McCrory | 137/266 X |
| 2,884,941 | 5/1959 | Wallace | 137/505.11 X |
| 3,039,661 | 6/1962 | Wentz et al. | 222/399 X |
| 3,120,326 | 2/1964 | Hedeman | 137/266 X |
| 3,127,059 | 3/1964 | Lawrence et al. | 222/399 X |
| 3,211,350 | 10/1965 | Brown | 222/399 |
| 3,233,780 | 2/1966 | Cheeley | 222/399 X |
| 3,243,085 | 3/1966 | Wilson | 222/399 X |
| 3,245,583 | 4/1966 | Miller et al. | 222/399 X |
| 3,250,288 | 5/1966 | Hammon | 137/116.3 |
| 3,411,669 | 11/1968 | Puster | 222/397 X |

*Primary Examiner*—William R. Cline
*Attorney*—John F. C. Glenn et al.

[57] ABSTRACT

A pressure regulator construction for directing a propellant from a propellant source bottle into a fluid dispensing container, the pressure regulator construction having two housing members secured together to respectively engage and seal against opposed ends of a condition responsive element that controls a valve unit for the propellant source bottle. Such regulator construction can supply a manifold so that a plurality of fluid dispensing containers can be interconnected to the manifold, some of the fluid dispensing containers being interconnected to the manifold by other pressure regulator constructions.

25 Claims, 9 Drawing Figures

United States Patent
Wilson et al.

PRESSURE REGULATOR CONSTRUCTION AND SYSTEM UTILIZING THE SAME

BACKGROUND OF THE INVENTION

Fluid dispensing containers such as for containing beer, other carbonated beverages, and the like, have been provided for home use wherein the charging propellant for providing a dispensing force of the fluid within the container construction is supplied to the fluid dispensing container from a separate external source of charging propellant. Such charging propellant must be maintained at a proper pressure level in order to insure proper fluid dispensing from the dispensing container.

SUMMARY

This invention provides an improved pressure regulator construction for controlling the flow of fluid pressure to a fluid dispensing container or other desired structure.

This invention also provides an improved fluid pressure control system for a plurality of fluid dispensing container constructions or other desired devices.

In particular, the pressure regulator construction of this invention comprises a housing defining a chamber therein, the housing having an inlet opening leading to the chamber and being in fluid communication with an outlet structure of a fluid pressure storage container that is secured to the regulator housing so that fluid pressure can enter the chamber from the source container and be directed out of an outlet of the regulator to a fluid dispensing container. A condition responsive element is disposed in the chamber for controlling the flow of fluid from the source container into the chamber of the regulator. The housing has a first housing member provided with a surface interrupted by a recess and a second housing member disposed in the recess to close the same and cooperating therewith to hold the condition responsive element in engagement wth and between the two housing members.

Such pressure regulator construction can be utilized to direct pressure regulated fluid into a manifold which has a plurality of outlets, some of which can be directly interconnected to fluid dispensing containers to have the pressure of the propellant directed thereto at the same pressure level as is being directed into the manifold. However, other pressure regulators can receive the fluid pressure from the manifold and reduce the pressure level thereof so that other fluid dispensing containers can be interconnected to such reducing pressure regulator constructions for the proper propellant force therefor.

Other details, uses and advantages of this invention will become apparent as the following description of the present preferred embodiments thereof in the accompanying drawings proceeds.

DESCRIPTION OF THE DRAWINGS

The accompanying drawings show the present preferred embodiments of the invention, in which.

DESCRIPTION OF ILLUSTRATED EMBODIMENTS

Figure 1:
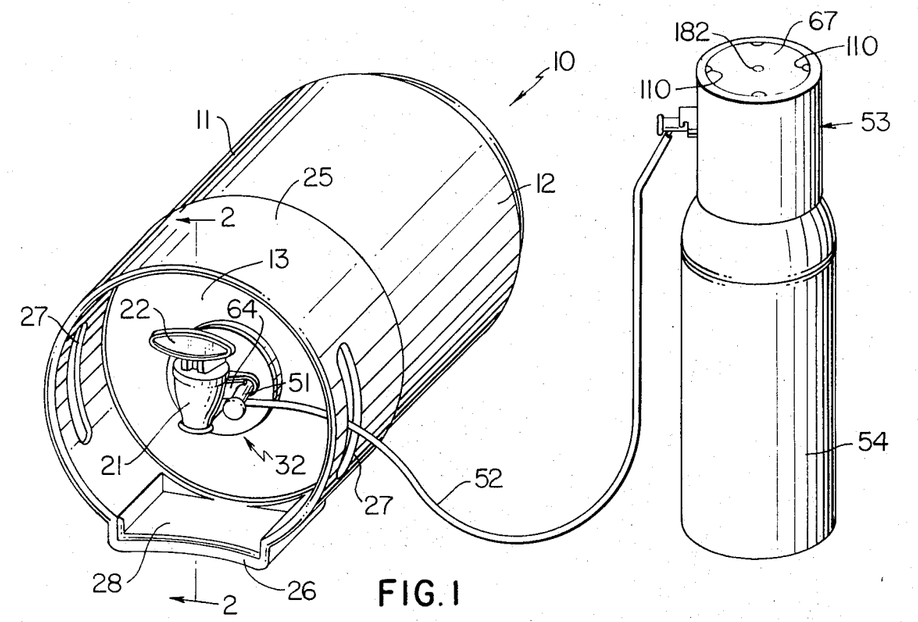
FIG. 1 is a frontal, perspective view of the improved pressure regulator construction and its source container attached to a fluid dispensing container construction.
Figure 2:
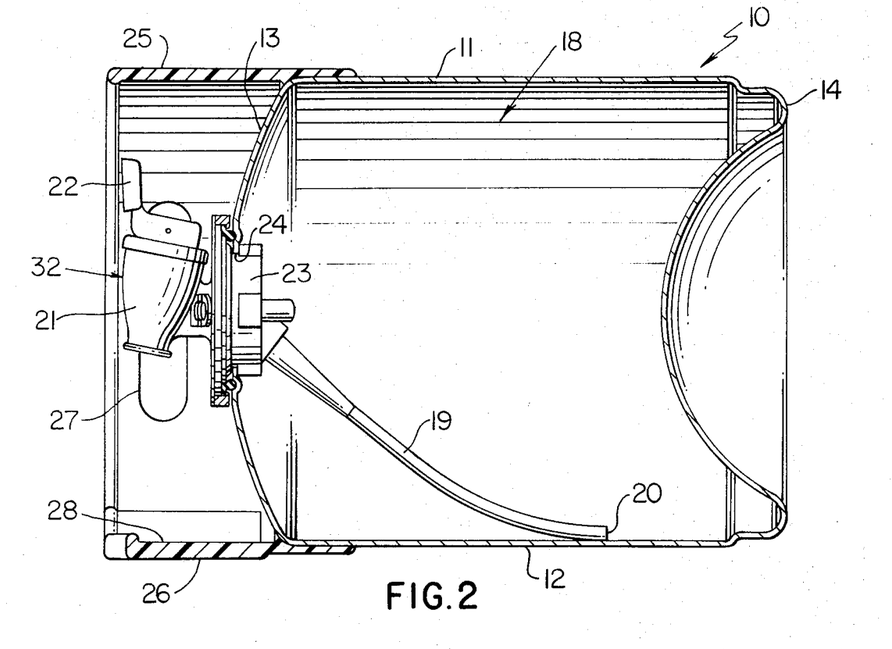
FIG. 2 is an enlarged, axial, cross-sectional view of the fluid dispensing container of FIG. 1.
Figure 3:
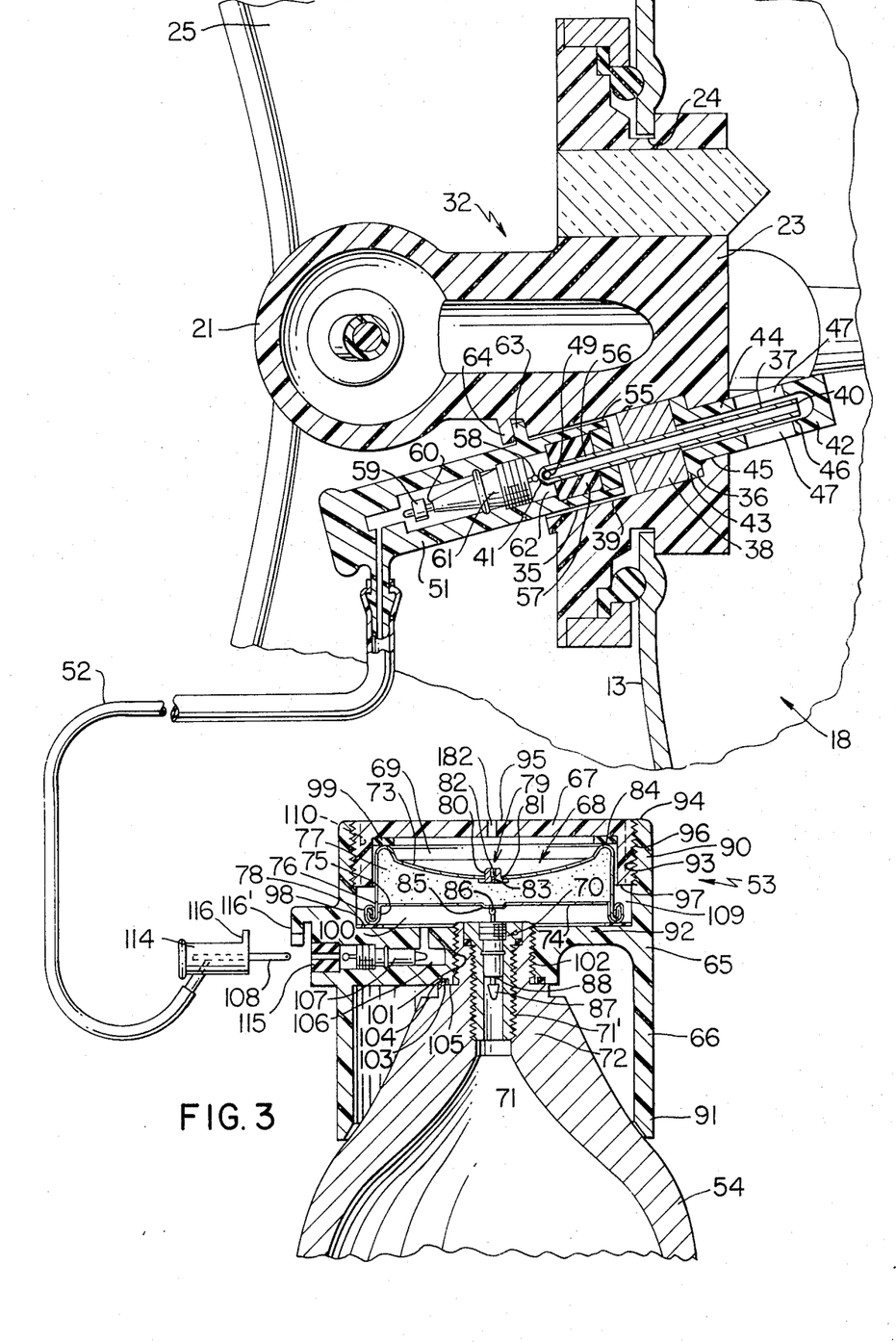
FIG. 3 is an enlarged, fragmentary, cross-sectional view of part of the fluid dispensing container and the pressure regulator construction of this invention.

Referring now to FIGS. 1, 2 and 3, an improved fluid dispensing container construction is generally indicated by the reference numeral 10 and comprises a container body 11 having a generally cylindrically shaped side wall means 12 provided with an outwardly directed convex front end wall 13 and a concave rear end wall 14. Such container body 11 defines a fluid receiving chamber 18 therein which can be placed under pressure by a suitable propellant, such as $CO_2$, also disposed within the chamber 18 and acting directly on the fluid, such as beer, carbonated beverage, and the like, disposed in the chamber 18 to force the same up a syphon and/or anti-foam tube 19 at the inlet end 20 thereof and out through an external spigot 21 that is opened and closed by a handle means 22 thereof in a manner well known in the art whereby the fluid dispensing container 10 can be utilized to manually dispense desired quantities of fluid therefrom. The spigot 21 and syphon tube 19 are carried by a molded plastic structure or member 23 sealingly disposed in a central opening 24 formed in the front end wall 13.

The spigot 21, member 23 and syphon tube 19 thus define a dispensing unit 32 for the container construction 10.

An annular collar 25 is carried by the container body 11 to not only provide a flat section 26 for supporting the container construction 10 in the dispensing position illustrated in FIGS. 1 and 2 so that no accidental rolling of the container construction 11 from its dispensing position can take place, but also the annular collar as provides opposed hand holes 27 for facilitating the carrying of the container construction 10 and a recessed part 28 for providing a fluid drip trap for the spigot 21.

The fluid dispensing container construction 10 and its associated collar 25 do not form the claimed subject matter of this application but form the claimed subject matter of applicant's co-pending patent application, Serial No. 213,433, filed Dec. 29, 1971. However, sufficient details of the fluid dispensing container construction 10 will now be described in order to fully understand the function of the pressure regulator construction of this invention.

In particular, the member or plate 23 of the dispensing unit 32 of the container construction 10 has a stepped bore 35 passing therethrough with the stepped bore 35 defining an annular shoulder 36 within the member 23, as illustrated in FIG. 3. A needle-like tubular member 37 is carried by a cylindrical retainer 38 that is press-fitted into the larger section 39 of the stepped bore 35 so as to position an open end 40 of the tubular member 37 within the chamber 18 and an outer closed end 41 of the needle-like member 37 externally of the container body 11 but within the larger portion 39 of the stepped bore 35 so that such projecting part of the needle-like member 37 is protected within the stepped bore 35 as illustrated. An encasing, flexible, one-way valve member 42 has an annular flange means 43 disposed between the retainer 38 and the shoulder 36 of the stepped bore 35 while the remaining portion 44 thereof projects through the reduced part 45 of the stepped bore 35 and extends beyond the end 40 of the needle-like member 37, the member 42 having an opening 46 therein which surrounds the needle-like member 37 and is adapted to be interconnected through slits 47 formed in the side thereof to a chamber 18 of the container body 11 when a fluid pressure in the opening 46 is greater than the fluid pressure in the chamber 18.

A coupling end or outlet member 51 of a tube means 52 leading from a pressure regulator construction 53 of this invention for a propellant source bottle 54 has a cylindrical end 55 adapted to be inserted into the larger section 39 of the opening 35 of the dispensing unit 32 in the manner illustrated in FIG. 3 so that the needle-like member will be received through a self-sealing slit bore or hole 56 in a sealing member 57 thereof and engage against a valve member plunger 58 to move a valve member 59 away from its valve seat 60 of a valve unit 61 carried in the end member 51. In this manner, the propellant passing from the propellant storage container 54 through the pressure regulator construction 53 and into the tube 52 can now pass through the open valve unit 61 to a chamber 62 defined between the valve device 61 and the sealing member 57 and, from the chamber 62, into the inlet opening 49 of the needle-like member 37 and, thus, to the chamber 18 for pressurizing the liquid therein.

The pressure regulator construction 53 for the propellant source bottle 54 will maintain the pressure of the propellant entering the chamber 18 of the dispensing container 10 at a predetermined pressure level, in a manner hereinafter described, that is satisfactory for dispensing the particular liquid of the container 10 through the syphon tube 19 and the dispensing unit 32 when the spigot 21 is opened by the handle 22 as previously described, the outlet end member 51 and its co-operating needle-like member 37 also not providing the claimed subject matter of this patent application, but forming the claimed subject matter of the aforementioned co-pending patent application, Ser. No. 213,433, filed Dec. 29, 1971.

Nevertheless, the member 51 when inserted into the opening 35 of the dispensing unit 32 in the manner illustrated in FIG. 3, can be maintained in its valve unit 61 open position as illustrated by having a tongue 63 of the end member 51 rotated under a cooperating and locking tongue 64 of the dispensing unit 32 until it is desired to disconnect the source container 54 from the fluid dispensing container 10.

Thus, the ultimate consumer can merely store the dispensing container 10 in the position illustrated in FIG. 1 in a refrigerator or other cooling structure and attach the end 51 of the storage tank 54 thereto, as illustrated in FIGS. 1 and 3, so that the dispensing container 10 will remain fully and constantly charged with propellant for forcing liquid therein through the spigot construction 21 when desired and when the particular container construction 10 has been emptied, the propellant storage tank 54 can be uncoupled therefrom and be utilized with a new dispensing container for the same purposes.

The details of the structure and operation of the pressure regulator construction 53 of this invention, in combination with the fluid source container 54 will now be described.

Figures 4, 5, 6:
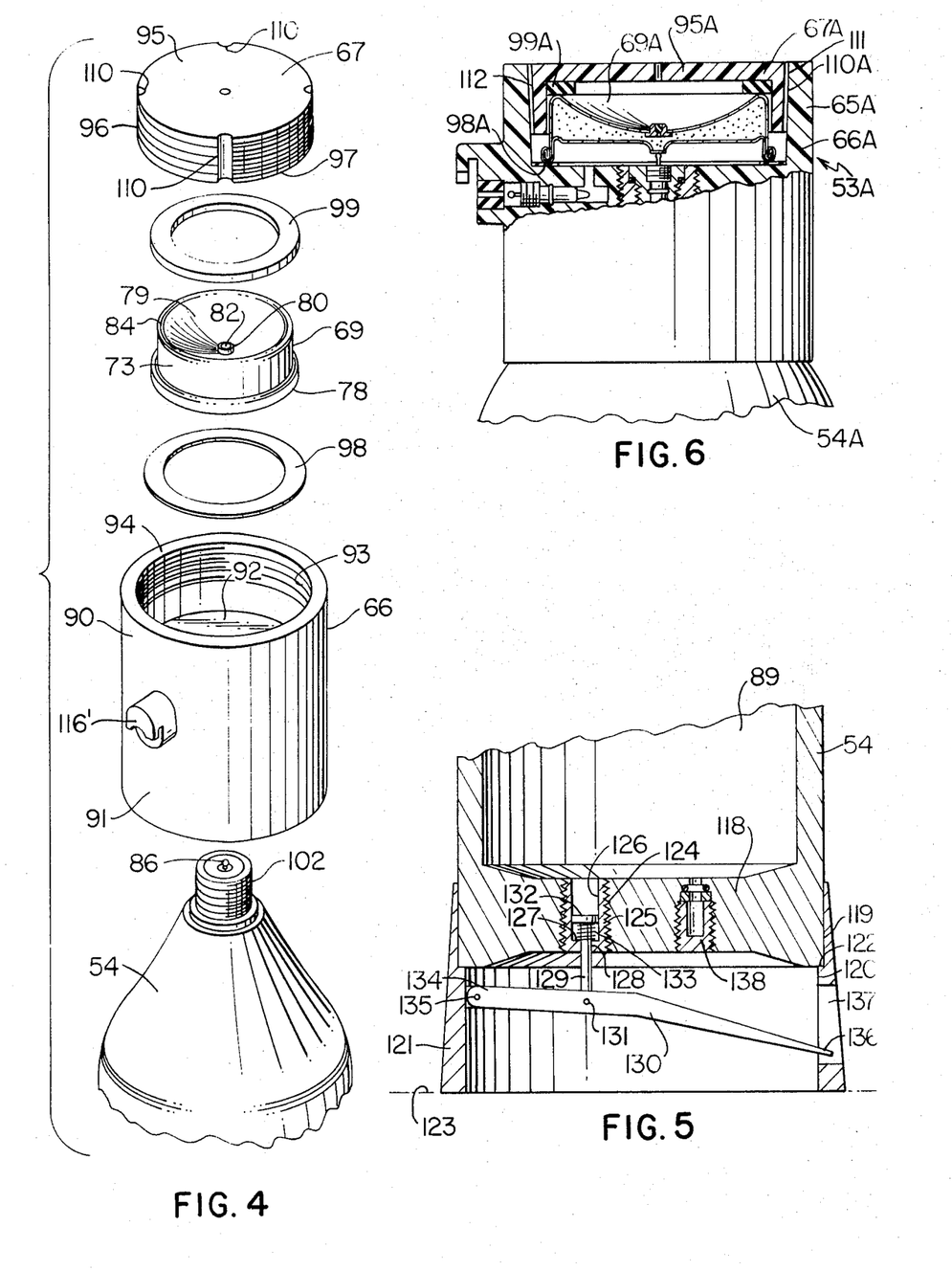
FIG. 4 is an exploded, perspective view of the various parts of the pressure regulator construction of this invention.
FIG. 5 is a fragmentary, cross-sectional view illustrating an indicating means for the source container.
FIG. 6 is a fragmentary, partial, cross-sectional view illustrating another embodiment of the pressure regulator construction of this invention.

As illustrated in FIGS. 3 and 4, the pressure regulator construction 53 comprises a housing 65 formed from two housing members 66 and 67 defining a chamber 68 therebetween and receiving a condition responsive element 69 for controlling a valve unit 70 disposed in an outlet passage 71 of a threaded member 71f threaded into and sealed to the neck structure 72 of the propellant source container or bottle 54 in a manner hereinafter described.

The condition responsive element 69 is formed in substantially the same manner as set forth in the U.S. Pat. to Wilson et al., No. 3,583,289, and comprises a pair of cup-shaped walls 73 and 74 disposed in telescoping and spaced relation while having their open ends 75 and 76 crimped and rolled together to not only secure the members 73 and 74 together to define a sealed chamber 77 therebetween, but also to provide an annular edge structure 78 disposed outboard of and surrounding the wall 74. The wall 73 of the element 69 is formed with a recess 79 therein and carries a charging plug 80 in the center thereof, the charging plug 80 being secured in a central opening 81 in the wall 73 and having a self-sealing member 82 covering an opening 83 passing through the plug 80 so that a needle or the like can be inserted through the sealing member 82 into the chamber 77 to provide a fluid therein whereby such charging needle can be removed from the plug 80 and the member 82 will seal close the opening 83 to trap the fluid within the chamber 77 as illustrated. The recess 79 in the wall 73 also defines an outer annular edge 84 for the wall 73 that is opposed to the annular edge 78 thereof.

The wall 74 of the element 69 has a central projection 85 or merely a flat portion thereof abutting against the plunger 86 of the valve unit 70 for the container 54, the valve unit 70 being formed in the same manner as the valve unit 61 previously described whereby plunger 86 carries a valve member 87 normally disposed against a valve seat 88 to prevent fluid low through the valve unit 70 until the valve member 87 is moved away from the valve seat 88 by the plunger 86 being moved downwardly in FIG. 3 by the wall 74 of the element 69. Thus, the upward and downward movement of the wall 74 of the element 69 controls the opening and closing of the valve unit 70 and, thus, the amount of fluid pressure flow from the interior 89 of the source container 54 into the chamber 68 of the pressure regulator construction 53.

The housing member 66 has opposed upper and lower cup-shaped portions 90 and 91 with the upper cup-shaped portion 90 defining a flat interior wall or closed end 92 and an internally threaded side wall 93 leading to the open end 94 thereof. The other housing member 67 is also cup-shaped and defines a flat closed end wall 95 and an externally threaded side wall means 96 leading to the open end 97 thereof so as to thread with the side wall means 93 of the housing member 66. Thus, when the cup-shaped member 67 is fully disposed within the open end 94 of the housing member 66, the flat end wall 95 thereof is substantially flush with the open end 94 of the housing member 66.

A pair of annular, flexible gaskets 98 and 99 are respectively disposed in the cup-shaped housing members 66 and 67 against the closed ends 92 and 95 thereof, as illustrated, the gasket 98 being a sealing gasket and the gasket 99 being a relief gasket so that when the housing member 67 is in its recess closing position in the housing member 66, as illustrated in FIG. 3, the annular edge 78 of the condition responsive element 69 is compressed against the sealing gasket 98 and the opposed annular portion 84 of the element 69 is compressed against the relief gasket 99 so that the part 100 of the chamber 68 in the pressure regulator construction 53 that is defined below th wall 74 of the element 69 inboard of the annular edge 78 thereof is completely sealed by the gasket 98 and is the part of the chamber 68 that is adapted to be in fluid communication with the valve unit 70 of the storage container 54.

The housing member 66 has a threaded opening 101 formed through the closed end 92 thereof so as to be threaded to an externally threaded portion 102 of the neck structure 72 of the stroage container 54, as illustrated in FIG. 3, whereby the opening 101 can be sealed thereto by an annular seal ring 103 disposed within an annular groove 104 in the housing 65 and abutting against an annular shoulder 105 of the neck portion 72. The threaded securement of the pressure regulator construction 53 onto the container 54 can be such a tight fit between the threaded portions 101 and 102 thereof that the tight threaded fit prevents someone from tampering with the securement so that the regulator 53 cannot be unthreaded from the container 54 without special tools. For example, it may befound that the regulator 53 can be torqued to its container construction 54 with sufficient force that a strap wrench would be necessary to unthread the regulator 53 from the container 54. Also, by having the other cup-shaped portion 91 of the housing member 66 telescoped over the neck portion 72 of the storage container 54, as illustrated in FIG. 3 such lower cup-shaped portion 91 prevents tampering at the neck portion 72 of the container construction 54. Additionally, the lower cup-shaped portion 91 strengthens the securement of the regulator 53 to the neck structure 72 of the container construction 54.

An outlet passage 106 is formed in the closed end 92 of the housing member 66 and has a valve unit 107 therein that normally closes the outlet passage 106 until a needle member 108 of a handle member 114 at the lower end of the conduit 52 is inserted through a seal member 115 to actuate the valve unit 107 to its open position. The handle member 108 having a tongue 116 thereon for locking under the cooperating tongue 116′ of the regulator 53 to maintain the valve unit 107 in its open position to be fluidly connected to the conduit 52. Thus, the conduit 52 can be coupled and secured to the regulator 53 as illustrated so that any fluid pressure that is directed into the chamber part 100 of the pressure regulator construction 53 through the opened valve unit 70 will be conveyed by the conduit 52 to the valve unit 61 of the end member 51 thereof. Since the force of the pressure fluid in the chamber 100 acts against the wall 74 of the sensing element 69, in a direction to tend to allow closing of the valve unit 70, the sensing element 69 will maintain the pressure in the chamber 100 at the predetermined pressure value that is adequate for the particular fluid in the dispensing container 10, such sensing condition of the element 69 is dictated by the amount of fluid in the chamber 77 of the element 69.

However, should the pressure in the chamber 100 of the pressure regulator construction 53 exceed a safe value, such as by the valve unit 70 sticking in an open position thereof, the upward force of the pressure fluid in the chamber part 100 onthe element 69 will cause the annular edge 84 to compress into the relief gasket 99 a sufficient amount to permit the lower edge 78 of the element 69 to move away from the sealing gasket 98 so that pressure fluid in the portion 100 of the chamber 68 can escape between the gasket 98 and the edge 78 into the chamber portion 109 and to the atmosphere through semicircular relief grooves 110 formed in the side wall means 96 of the housing member 67.

Reference is now made to FIG. 6 wherein another pressure regulator construction of this invention is generally indicated by the reference numeral 53A and parts thereof similar to the regulator construction 53 previously described are indicated by like reference numerals followed by the reference letter A. As illustrated in FIG. 6, the pressure regulator construction 53A has the housing means 65A thereof formed from the housing members 66A and 67A in such a manner that the housing member 66A has a frusto-conical portion 111 adhesively secured to a frusto-conical portion 112 of the housing member 67A to secure the same together in the cooperating manner previously described to trap the condition responsive element 69A therebetween with the gaskets 98A and 99A performing their function in the manner previously described because the side wall portion 112 of the housing member 67A has grooves 110A therein to provide pressure relief passages as provided by the grooves 110 in the housing member 67 of FIG. 3. Thus, it can be seen that the housing members 65 and 66 can be secured in any desired manner and the grooves 110 will still provide the pressure relief function previously described.

Returning now to the pressure regulator construction 53 of FIG. 3, while the same is illustrated as having only one connector 52 for leading to a fluid dispensing construction 10, it is to be understood that the single regulator construction 53 can be utilized to charge a plurality of fluid dispensing constructions 10, if desired. For example, the housing member 66 can have another outlet passage formed therein and leading from the chamber part 100 to a one way valve unit similar to unit 107 to be opened by a handle member in the same manner as the handle member 114 previously described. Alternately, a T connector could be inserted in the conduit 52 for coupling the conduit 52 to another fluid dispensing container 10 so that the single regulator 53 and container 54 can provide the propellant for one or more dispensing container 10.

The propellant storage container 54 can be provided with an indicator to indicate to the user when the charge of propellant therein has been used up to a level that a new storage container 54 must be utilized in order to properly charge a fluid container construction 10. For example, reference is now made to FIG. 5 wherein the propellant storage container 54 has its bottom wall 118 supported within the larger portion 119 of an opening 120 passing through a supporting skirt 121 so as to bear against an annular shoulder 122 thereof and be supported above a suitable supporting structure 123 on which the skirt 121 is resting. The bottom wall 118 has a threaded opening 124 passing therethrough and threadedly receives a retainer 125 having a cylinder 126 formed therein and leading to the chamber 89 in the container 54, the cylinder 126 defining a shoulder 127 that has an opening 128 passing therethrough and receiving a piston rod 129 pivotally interconnected to an indicating lever 130 by a pivot pin 131. The piston rod 129 carries an enlarged piston 132 on the upper end thereof which fits into the cylinder 126 and is normally urged in an up condition thereof by a compression spring 133 disposed in the cylinder 126 between the piston 132 and the shoulder 127.

The lever 130 has an end 134 pivoted to the skirt 121 by a pivot pin 135 and the other end 136 thereof projecting into an opening 137 passing through the side wall of the skirt 121.

When the fluid pressure in the chamber 89 of the storage container 54 is of a certain value, the same acts downwardly on the piston 132 to drive the same downwardly, as illustrated in FIG. 5, against the force of the compression spring 133 and pivot the lever 130 with its and 136 at the lower portion of the opening 137. Thus, with the end 136 of the lever 130 in the lower portion of the opening 137, the user knows that the propellant supply in the container 54 is sufficient for charging purposes. However, when the pressure of the fluid in the chamber 89 of the container 54 fall below a pressure value necessary for charging fluid dispensing containers and the like, the force of the compression spring 133 overcomes the internal force in the chamber 89 of the container 54 to move the piston 132 upwardly, and thus pivot the lever 130 in an upward direction in FIG. 5 so that the end 136 of the lever 130 is in the upper portion of the opening 137 which indicates to the user that a new storage container 54 must be provided as an insufficient amount of fluid pressure remains in the chamber 89 of the respective storage container 54 for charging purposes.

An alternate approach would be to provide a scale means that continuously weighs and indicates the weight of the $CO_2$ or other propellant remaining in the container 54.

In the regulator constructions of this invention previously described, the regulator construction 53 is torqued onto the threaded neck portion 72 of the propellant container 10 with the wall 92 of the housing member 66 abutting against the shoulder 105 on the neck portion 72 of the container 54. Thus, in order to properly initially set the regulator construction 53 after it is assembled to a propellant container 54 to produce the desired pressure value of the propellant being supplied to the conduit 52 for a fluid dispensing container 10, it is necessary to make sure that the fluid being injected into the chamber 77 of the condition responsive element 69 will cause the wall 74 thereof to operate the valve unit 70 in such a manner that the desired propellant pressure would be provided by the regulator 53 at a particular ambient temperature.

However, it has been found according to the teachings of this invention, that the condition responsive element 69 can be manufactured to contain a predetermined pressure in the chamber 77 thereof and after being assembled to a particular pressure regulator construction 53, that pressure regulator construction 53 could be threaded onto the neck structure 72 of the propelalnt container 54 in a calibrated manner so that the pressure regulator construction 53 would provide the desired propelalnt pressure at a particular ambient temperature being sensed by the condition responsive element 69. At this threaded position between the pressure regulator construction 53 and the propellant container 54, the pressure regulator 53 can then be secured to the propellant container 54 so that further threading or unthreading therebetween could not take place without special tools.

Figure 9:
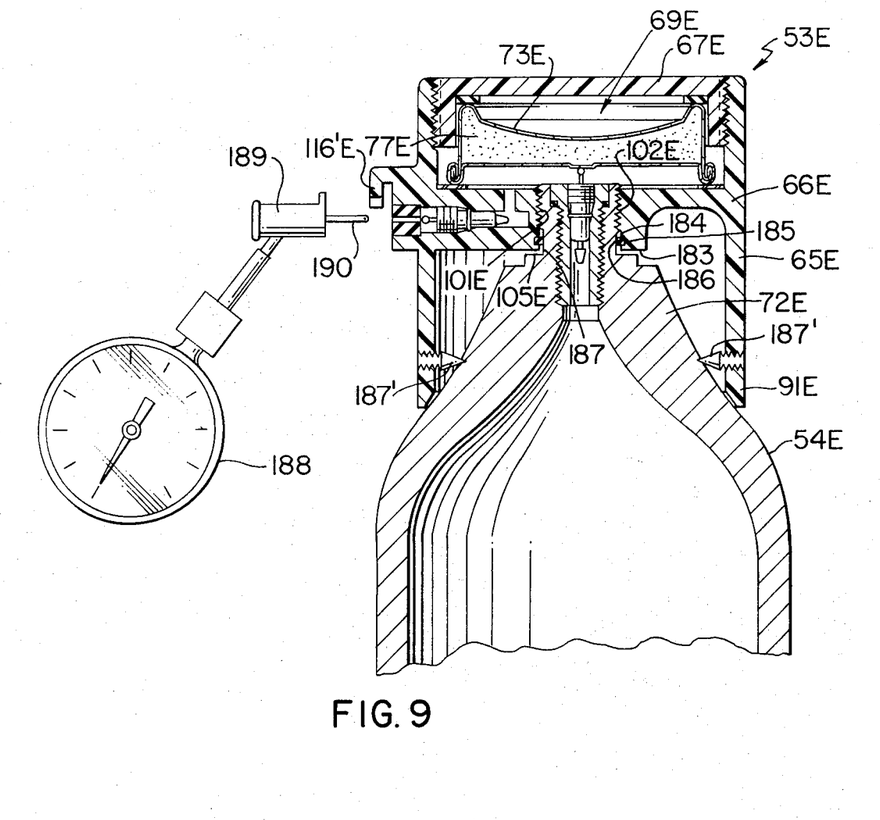
FIG. 9 is a view similar to FIG. 6 and illustrates another embodiment of the pressure regulator construction of this invention.

For example, another pressure regulator construction of this invention is generally indicated by the reference numeral 53E in FIG. 9 and parts thereof similar to the other pressure regulator constructions of this invention are indicated bylike reference 1umerals followed by the reference letter E.

As illustrated in FIG. 9, it can be seen that the condition responsive element 69E does not have any needle charging plug 80 formed in the upper wall 73E thereof and the housing member 67E likewise does not have any charging opening 182 therein. However, the threaded portion 101E of the housing member 66E terminates short of a lower surface 183 thereof to define an unthreaded portion 184 having a groove 185 therein and receiving an annular seal member 186 which will seal against an unthreaded portion 187 of the neck structure 72E of the container 54E that is located just below its externally threaded part 102E. In this manner, the housing member 66E will be sealed by the member 186 to the container 54E and the threaded relationship between the housing 65E and container 54E can be adjusted upwardly and downwardly as long as the shoulder 105E of the container 54E is not engaged by the lower surface 183 of the housing member 66E.

Once the desired threaded relationship exists between the regulator 53E and the container 54E to produce a desird pressure regulation for the propellant passing from the container 54E through the regulator 53E, the pressure regulator 53E can be fastened to the container 54E by drive pins 187' being carried by the skirt portion 91E of the regulator construction 53E and being driven into the neck structure 72E of the container 54E as illustrated in FIG. 9 so that further turning or threading of the regulator 53E relative to the container 54E cannot take place because it requires special tools to remove the drive pins 187'.

Thus, it can be seen that the condition responsive element 69E of the regulator construction 53E can be preassembled ina an atmosphere that will provide a predetermined pressure within the chamber 77E thereof, such as 25 psig or any desired psig normally in the range of 10 to 30 psig. Such assembled condition responsive element 69E can then be assembled in the housing 65E of the pressure regulator construction 53E in the manner previously described. The thus assembled pressure regulator construction 53E would be threaded onto the threaded part 102E of the neck portion 72E of the container 54E. A pressure gage 188 having a handle member 189 provided with a needle 190 in a manner similar to the other handle members 114 of this invention would then be plugged into the outlet passage 106 and locked under the tongue 116/E to maintain the valve unit 115 in an open condition so that the gage 188 can continuously indicate the pressure being provided at the chamber portion 100E of the regulator constrction 53E by the element 69E operating on the valve unit 70E. Then by merely further threading the pressure regulator construction 53E on the container 54E or unthreading the same by rotating the regulator construction 53E in an unthreading direction, the desired pressure will eventually be produced in the chamber portion 100E and will be indicated by the gage 188 so that when such reading appears on the gage 188, the pressure regulator 53E then is secured to the container 54E by the drive pins 187 and the gage 188 is removed so that the resulting structure of FIG. 9 can then be utilized for charging a fluid dispensing container 10 in the manner previously described.

Therefore, it can be seen that not only does this invention provide an improved pressure regulator construction 53, but also this invention provides an improved propellant storage container 54 in combination therewith.

As previously stated, the pressure regulator construction of this invention can be utilized to provide a control system for charging a plurality of fluid dispensing containers, if desired. For example, such a system of this invention is generally indicated by the reference numeral 140 in FIGS. 7 and 8 and is disposed in a refrigerator 141 adjacent the ice chest 142 thereof.

Figures 7, 8:
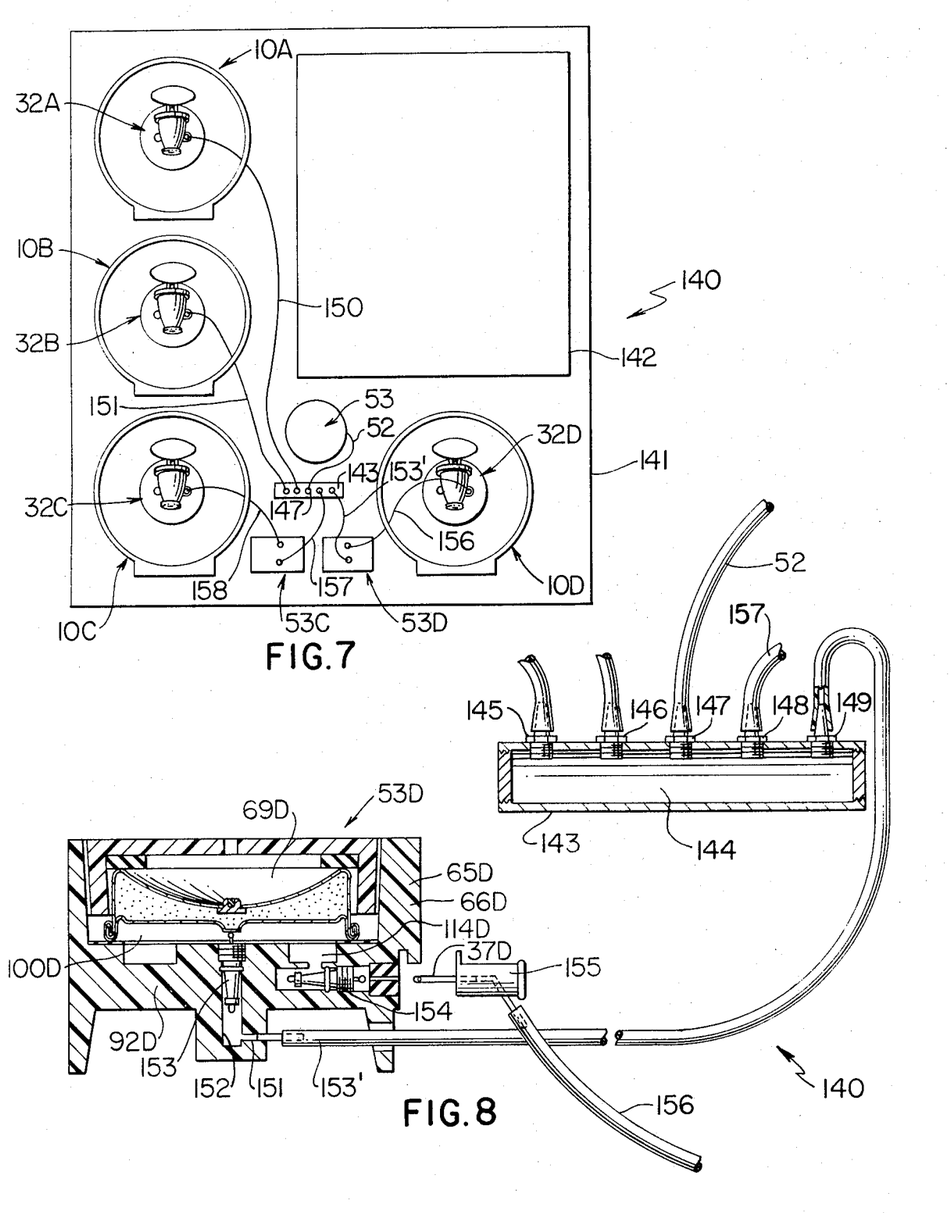
FIG. 7 is a schematic view illustrating the improved fluid pressure control system of this invention for a plurality of fluid dispensing containers.
FIG. 8 is a fragmentary, cross-sectional view illustrating part of the structure of the system of FIG. 7 as well as another pressure regulator construction of this invention.

The control system 140 includes a manifold member 143 having a sealed chamber 144 therein and fluidly interconnected to a plurality of conduit interconnecting nipples 145, 146, 147, 148 and 149, as illustrated in FIG. 8. A main pressure regulator construction 53 formed in the manner previously described and interconnected to the propellant storage container 54 in the manner previously described is interconnected by its conduit 52 to the nipple 147 of the manifold 143 to supply fluid pressure into the chamber 144 at one pressure level.

Such main pressure level of the fluid pressure in the chamber 144 governed by the pressure regulator 53 is such that the same is a suitable pressure level for the particular beverages contained within the container constructions 10A and 10B, illustrated in FIG. 7, so that the interior of the manifold 144 is directly interconnected to the dispensing units 32A and 32B of the container constructions 10A and 10B by conduits 150 and 151 having outlet members 51 formed in the manner previously described.

However, it may be found that the dispensing containers 10C and 10D for the system 140 require a fluid pressure force for the particular liquids therein at reduced rates from the pressure level being supplied by the main regulator 53 to the manifold 144. Thus, satellite pressure regulator constructions 53C and 53D of this invention are respectively provided in the system 140 for the fluid dispensing containers 10C and 10D.

For example, the satellite regulator construction 53D is illustrated in FIG. 8 and parts thereof similar to the regulator construction 53 previously described are indicated by like reference numerals followed by the reference letter D, the satellite regulator construction 53C being the same as the regulator construction 53D.

As illustrated in FIG. 8, the housing member 66D of the housing 65D of the regulator 53D is slightly changed from the housing member 66 previously described as the same is not adapted to be interconnected to a storage container 54. Thus, no inlet threaded opening 101 is provided in the closed end 92D of the housing 66D and in place thereof, an inlet passage 151 is formed therein which contains a valve unit 153 formed in the same manner as the valve unit 70 previously described and being actuated by the condition responsive element 69D. However, the passage 152 is interconnected by a conduit means 153' to the nipple 149 of the manifold 143 so that the fluid pressure delivered from the chamber 155 by the manifold 143 through the conduit 153' to the valve unit 153 of the satellite regulator construction 53D is controlled by the element 69D to supply a fluid pressure within the chamber part 100D thereof at a reduced value suitable for fluid dispensing pruposes for the container 10D.

In particular, the outlet passssage means 114D for the satellite regulator 53D has a valve unit 154 therein that is adapted to be actuated to an open position by a needle-like member 37D carried in a handle member 155 and fluidly interconnected by an outlet member 51 to the dispensing unit 32D of the container 10D by a conduit means 156 as illustrated. Thus, the satellite regulator 53D will supply fluid pressure to the dispensing container 10D at a pressure value controlled by the satellite regulator 53D which is lower than the pressure value supplied to the chamber 144 of the manifold 143 by the main regulator 53 previously described.

In like manner, the satellite regulator 53C has its inlet interconnected by a conduit means 157 to the manifold 143 and its outlet interconnected by a conduit means 158 to the dispensing unit 32C of the dispensing contaInr 10C so as to have the pressure value thereof regulated by the satellite regulator 53C to a value lower than that supplied to the manifold 143 by the main regulator 53.

Thus, it can be seen that the regulator constructions of this invention can provide a satellite purpose for a control system for a plurality of fluid dispensing containers or the like.

If desired, the storage container 54 of this invention, when emptied, can be readily refilled with a desired propellant through the top thereof or through an opening provided in the bottom wall 118 thereof and normally closed by a valve unit similar to the valve unit 61 previously described. Also, to provide for pressure relief of the chamber 89 inside the bottle or container 54, a burst disc arrangement 138 could be threaded into a thread port through the wall 118 of the container 54, as illustrated in FIG. 5.

Therefore, while present preferred embodiments of the invention have been illustrated and described, it will be recognized that the invention may be otherwise variously embodied and practiced within the scope of the following claims.

What is claimed is:

1. A pressure regulator construction comprising a housing defining a chamber therein, said housing having an inlet leading to said chamber whereby fluid pressure can enter said chamber from a source thereof through said inlet, said housing having an outlet leading from said chamber to the exterior of said housing for directing, regulated pressure fluid therefrom, a condition responsive element disposed in said chamber for controlling the flow of fluid from said source into said chamber, said housing having a first housing member provided with a surface interrupted by a recess, said housing having a second housing member disposed in said recess to close the same and cooperating therewith to define said chamber therebetween and hold said element in engagement with and between said housing members, said condition responsive element comprising a container having opposed ends and defining a chamber therein containing a condition responsive fluid, said opposed ends respectively being compacted toward each other by said housing members, and a pair of gaskets rspectively disposed between said housing members and said condition responsive element to seal the part of said chamber defined between said container at one end thereof and the housing member facing said one end thereof, one of said pair of gaskets being arranged at the other end of said condition responsive element and being more compressible than the gasket at said one end of said element to premit excessive pressure to escape between said one end of said element and the other of said pair of gaskets.

2. A pressure regulator construction as set forth in claim 1 wherein said second housing member is cup-shaped and has its closed end closing the recess in said first housing member, the open end of said second housing member cooperating with said first housing member to define said chamber therebetween, said condition responsive element being received in said open end of said second housing member.

3. A pressure regulator construction as set forth in claim 1 wherein said recess in said first housing member is frusto-conical in configuration and said second housing member is frusto-conical to complement said recess when received therein.

4. A pressure regulator construction as set forth in claim 3 wherein one of said housing members has a relief groove therein leading from said chamber outboard of said condition responsive element to the exterior thereof.

5. A pressure regulator construction as set forth in claim 1 wherein said housing members are threaded together to compact said condition responsive element therebetween.

6. A pressure regulator construction as set forth in claim 1 wherein said inlet is constructed to provide means for securing said regulator construction to a fluid pressure source container.

7. A pressure regulator construction as set forth in claim 1 wherein said outlet has a valve unit therein.

8. A pressure regulator construction as set forth in claim 7 wherein said valve unit comprises a plunger actuated valve unit.

9. In combination, a pressure regulator construction comprising a housing defining a chamber therein, a fluid pressure storage container having an outlet structure and being secured to said regulator housing, said housing having an inlet opening leading to said chamber and being in fluid communication with said outlet structure whereby fluid pressure can enter said chamber from said container through said inlet opening, said housing having an outlet leading from said chamber to the exterior of said housing for directing regulated pressure fluid therefrom, a condition responsive element disposed in said chamber for controlling the flow of fluid from said container into said chamber, said housing having a first housing member provided with a surface interrupted by a recess, said housing having a second housing member disposed in said recess to close the same and cooperating therewith to define said chamber therebetween and hold said element in engagement with and between said housing members, and a pair of gaskets respectively disposed between said housing members and said condition responsive element to seal the part of said chamber defined between said container at one end thereof and the housing member facing said one end thereof, one of said pair of gaskets being at the other end of said condition responsive element and being more compressible than the gasket at said one end of said element to permit excessive pressure to escape between said one end of said element and the other of said pair of gaskets.

10. A combination as set forth in claim 9 wherein said inlet structure of said container has a valve unit therein for fluidly interconnecting said container to said chamber when said valve unit is opened.

11. A combination as set forth in claim 10 wherein said condition responsive element contacts said valve unit to control the opening and closing thereof in relation to the condition sensed thereby.

12. A combination as set forth in claim 9 wherein said storage container has a neck portion threaded into said inlet of said regulator housing to secure said regulator construction and said container together.

13. A combination as set forth in claim 12 wherein said first housing member carries said inlet and has a skirt portion telescoped over said neck portion of said container.

14. A combination as set forth in claim 9 wherein said container has an indicator for indicating when the pressure fluid therein has been reduced to a certain amount.

15. A combination as set forth in claim 14 wherein said indicator is pressure operated.

16. A combination as set forth in claim 9 wherein said container has a skirt-like support member at one end thereof to support said container and interconnected regulator construction on a desired structure.

17. In combination: a manifold; a fluid pressure source; a first pressure regulator construction interconnecting said source to said manifold to supply said manifold with fluid pressure at a first predetermined value; a plurality of fluid dispensing containers having chambers therein; a plurality of conduits respectively fluidly interconnecting said container chambers to said manifold; and at least one of said conduits having a second pressure regulator construction changing the fluid pressure from said manifold to its respective container chamber to a level different than the pressure level provided by said first pressure regulator construction; at least one of said pressure regulator constructions comprising a housing defining a chamber therein, said housing having an inlet leading to said chamber whereby fluid pressure can enter said chamber from said source or said manifold through said inlet, said housing having an outlet leading from said housing chamber to the exterior of said housing for directing regulated pressure fluid therefrom, and a condition responsive element disposed in said housing chamber for controlling the flow of fluid from said inlet into said housing chamber, said housing having a first housing member and a second housing member cooperating therewith to define said housing chamber therebetween and hold said element in engagement with and between said housing members.

18. A combination as set forth in claim 17 wherein said condition responsive element comprises a container having opposed ends and defining a chamber therein containing a condition responsive fluid, said opposed ends respectively being compacted toward each other by said housing members.

19. A combination as set forth in claim 18 wherein one of said ends of said condition responsive container has a valve member actuating part.

20. A combination as set forth in claim 18 wherein a pair of gaskets are respectively disposed between said housing member and said condition responsive element to seal the part of said housing chamber defined btween said element at one end thereof and the housing member facing said one end thereof.

21. A combination as set forth in claim 20 wherein the gasket at the other end of said condition responsive element is more compressible than the gasket at said one end of said element to permit excessive pressure to escape between said one end of said element and its associated gasket.

22. A combination as set forth in claim 17 wherein said inlet is so constructed that the same secures said regulator construction to a container that provides said fluid pressure source.

23. A combination as set forth in claim 17 wherein said outlet has a valve unit therein.

24. A combination as set forth in claim 23 wherein said valve unit comprises a plunger actuated valve unit.

25. A combination as set forth in claim 24 wherein said conduit that interconnects said second regulator construction to its respective container chamber has a needle-like tubular member inserted in said outlet and engaging said plunger of said valve unit to hold the same in its opening position.

* * * * *